United States Patent
Kim (10) Patent No.: US 10,337,873 B2
(45) Date of Patent: Jul. 2, 2019

(54) NAVIGATION APPARATUS, VEHICLE INCLUDING THE NAVIGATION APPARATUS, AND METHOD OF CONTROLLING THE VEHICLE

(71) Applicant: HYUNDAI MOTOR COMPANY, Seoul (KR)

(72) Inventor: Sang Hun Kim, Anyang-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 28 days.

(21) Appl. No.: 15/381,725

(22) Filed: Dec. 16, 2016

(65) Prior Publication Data
US 2018/0080783 A1 Mar. 22, 2018

(30) Foreign Application Priority Data
Sep. 21, 2016 (KR) .......... 10-2016-0120389

(51) Int. Cl.
*G01C 21/34* (2006.01)
*G01C 21/36* (2006.01)

(52) U.S. Cl.
CPC ..... *G01C 21/3469* (2013.01); *G01C 21/3492* (2013.01); *G01C 21/3667* (2013.01); *G01C 21/3694* (2013.01)

(58) Field of Classification Search
CPC .......... G01C 21/3469; G01C 21/3492; G01C 21/3667; G01C 21/3694
See application file for complete search history.

(56) References Cited

U.S. PATENT DOCUMENTS

2012/0179315 A1* 7/2012 Tate, Jr. ............. G01C 21/3469
  701/22
2016/0303979 A1* 10/2016 Heyse ................... B60L 1/02

FOREIGN PATENT DOCUMENTS

| JP | 2014153264 A | 8/2014 |
| JP | 2014182035 A | 9/2014 |
| KR | 20050106322 A | 11/2005 |
| KR | 20130065433 A | 6/2013 |

* cited by examiner

*Primary Examiner* — Basil T. Jos
(74) *Attorney, Agent, or Firm* — Morgan Lewis & Bockius LLP

(57) ABSTRACT

A navigation apparatus includes a receiver for receiving weather information for one or more areas, a map data storage in which map data is stored, and a controller for generating one or more path sections using the weather information for the one or more areas and for determining a driving path for consuming a minimum amount of air conditioning power using the weather information and the map data for each path section.

20 Claims, 9 Drawing Sheets

NAVIGATION APPARATUS, VEHICLE INCLUDING THE NAVIGATION APPARATUS, AND METHOD OF CONTROLLING THE VEHICLE

CROSS-REFERENCE TO RELATED APPLICATION

This application claims the benefit of priority to Korean Patent Application No. 10-2016-0120389, filed on Sep. 21, 2016 with the Korean Intellectual Property Office, the disclosure of which is incorporated herein by reference.

TECHNICAL FIELD

Embodiments of the present disclosure relate to a navigation apparatus, a vehicle including the navigation apparatus and a method of controlling the vehicle.

BACKGROUND

Navigation apparatuses perform navigation functions in a vehicle, and additionally perform functions of audio, video, content playback, internet search, calling, short message transmitting and receiving, position search and other functions.

When performing the navigation function, navigation apparatuses calculate a current position by receiving positional information from satellites through a plurality of global positioning systems (hereinafter, referred to as GPSs), display the current position on a map by matching the current position with the map, determine a path from a current position to the destination according to a path detecting algorithm, display the determined path on the map by matching the determined path with the map, and guide a user or driver from the current position to the destination using the path.

Also, while driving on the road, navigation apparatuses visually or acoustically provide various pieces of information such as the current driving road, the detected path, a degree of congestion of the road, and the like.

In addition, navigation apparatuses display a driving direction for the vehicle, a distance to the destination, current driving speed of the vehicle, an optimal path to the destination, and the like, thus providing various pieces of information to a driver.

SUMMARY

Therefore, it is an aspect of the present disclosure to provide a navigation apparatus configured to generate an optimal path by reflecting weather information, a vehicle including the navigation apparatus, and a method of controlling the vehicle.

Also, it is another aspect of the present disclosure to provide a navigation apparatus configured to determine a path for consuming a minimum amount of air conditioning power using weather information, a vehicle including the navigation apparatus, and a method of controlling the vehicle.

Additional aspects of the present disclosure will be set forth in part in the description which follows and, in part, will be obvious from the description, or may be learned by practice of the present disclosure.

In accordance with some aspects of the present disclosure, a navigation apparatus includes a receiver, a map data storage, and a controller. The receiver may be configured to receive weather information for each area. The map data storage may be in which map data is stored. The controller may be configured to generate one or more path sections using the weather information for each area and may determine a driving path for consuming a minimum amount of air conditioning power using the weather information and the map data for each path section.

The receiver may receive temperature information as the weather information.

The controller may determine a driving path passing through path sections with the smallest temperature difference from a target temperature as the driving path for consuming a minimum amount of air conditioning power.

The controller may calculate a driving time for each path section using the map data, may calculate an estimated consumption amount of air conditioning power using the calculated driving time and the weather information for each of the path sections, and may determine a driving path with a minimum estimated consumption amount of air conditioning power.

The controller may calculate a driving distance and a driving speed for each path section using the map data and calculates the driving time for each path section based on the driving distance and the driving speed.

The receiver may further receive traffic information. The controller may calculate a driving time for each path section using the map data and the traffic information, may calculate an estimated consumption amount of air conditioning power using the calculated driving time and the weather information for each of the path sections, and may determine a driving path with a minimum estimated consumption amount of air conditioning power.

The navigation apparatus may further include a display configured to display the driving path determined by the controller. The controller may determine a driving path with a shortest driving time using the map data and the traffic information, may determine a driving path with a shortest driving distance using the map data, and may determine a driving path with minimum estimated consumption amount of the air conditioning power. The display may display the driving path with the shortest driving time, the driving path with the shortest driving distance, and the driving path with a minimum estimated consumption amount of the air conditioning power.

The receiver may receive humidity information as the weather information.

The controller may determine a driving path passing through one or more path sections with a lowest average humidity level as the driving path for consuming a minimum amount of air conditioning power.

In accordance with some aspects of the present disclosure, a vehicle includes a receiver, a map data storage, and a controller. The receiver may be configured to receive weather information for each area. The map data storage may be in which map data is stored. The controller may be configured to generate one or more path sections using the weather information for each area and may determine a driving path for consuming a minimum amount of air conditioning power using the weather information and the map data for each path section.

In accordance with another aspect of the present disclosure, a method of controlling a vehicle includes: receiving weather information for each area; and generating one or more path sections using the weather information for each area and determining a driving path for consuming a minimum amount of air conditioning power using the weather information and map data for each path section.

The receiving of weather information may include receiving temperature information as the weather information.

The determining of a driving path may include determining a driving path passing through path sections with the smallest temperature difference from a target temperature as the driving path for consuming a minimum amount of air conditioning power.

The determining of a driving path may include calculating a driving time for each path section using the map data, calculating an estimated consumption amount of air conditioning power using the calculated driving time and the weather information for each of the path sections, and determining a driving path with minimum estimated consumption amount of air conditioning power as the driving path for consuming a minimum amount of air conditioning power.

The determining of the driving path may include calculating a driving distance and a driving speed for each path section using the map data and calculating the driving time for each path section based on the driving distance and the driving speed.

The method may further include receiving traffic information before the determining of the driving path. The determining of the driving path may include calculating a driving time for each path section using the map data and the traffic information, calculating an estimated consumption amount of air conditioning power using the calculated driving time and the weather information for each of the path sections, and determining a driving path with a minimum estimated consumption amount of air conditioning power.

The method may further include displaying the driving path determined by the determining the driving path. The determining of the driving path may include determining a driving path with a shortest driving time using the map data and the traffic information, determining a driving path with a shortest driving distance using the map data, and determining a driving path with minimum estimated consumption amount of air conditioning power as the driving path for consuming a minimum amount of air conditioning power. The displaying may include displaying the driving path with the shortest driving time, the driving path with the shortest driving distance, and the driving path with a minimum estimated consumption amount of the air conditioning power.

The receiving of weather information may include receiving humidity information as the weather information.

The determining of the driving path may include determining a driving path passing through one or more path sections with a lowest average humidity level as the driving path for consuming a minimum amount of air conditioning power.

The method may further include receiving traffic information before the determining of the driving path. The determining of the driving path comprises calculating a driving distance for each path section using the map data, calculating a driving speed for each path section using the traffic information, and calculating the driving time for each path section based on the driving distance and the driving speed.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Hereinafter, exemplary embodiments of the present disclosure will be described in detail with reference to the accompanying drawings. Additional objects, features and operational advantages, including the object, constitution and effects of the present disclosure, will become more apparent from the detailed description of the exemplary embodiments. In this specification, when reference numerals are assigned to components of each drawing, it should be noted that, although the same components are illustrated in different drawings, the same numerals are assigned as much as possible. Further, in the following description of the present disclosure, a detailed description of known functions and configurations incorporated herein will be omitted when it may make the subject matter of the present disclosure unnecessarily unclear. It will be understood that, although the terms "first," "second," etc. may be used herein to describe various components, these components should not be limited by these terms.

Figure 1:
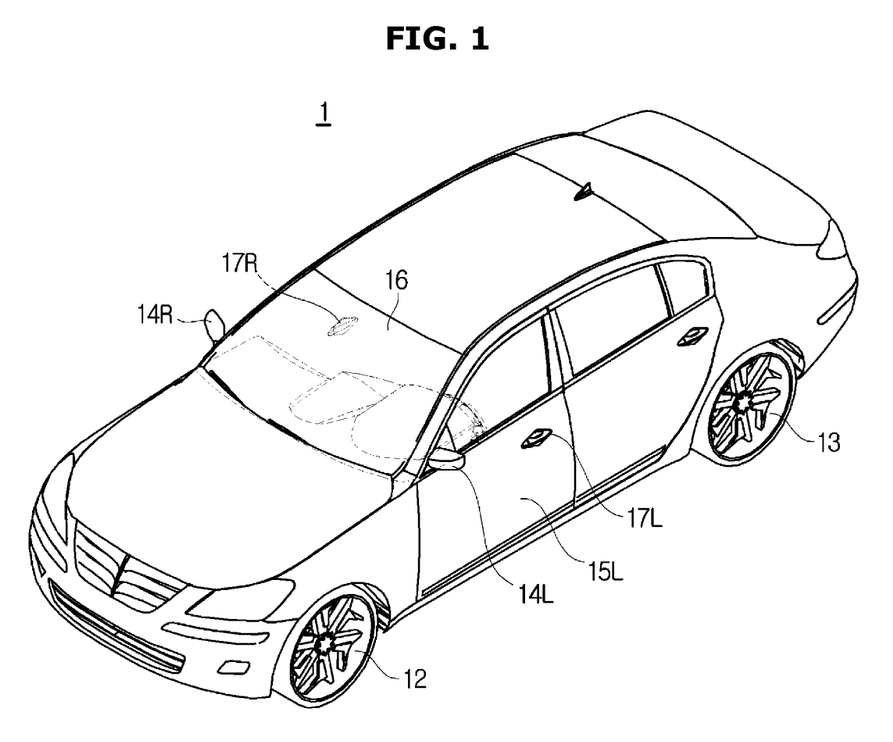
FIG. 1 is an exterior view of a vehicle according to exemplary embodiments of the present disclosure.
Figure 2:
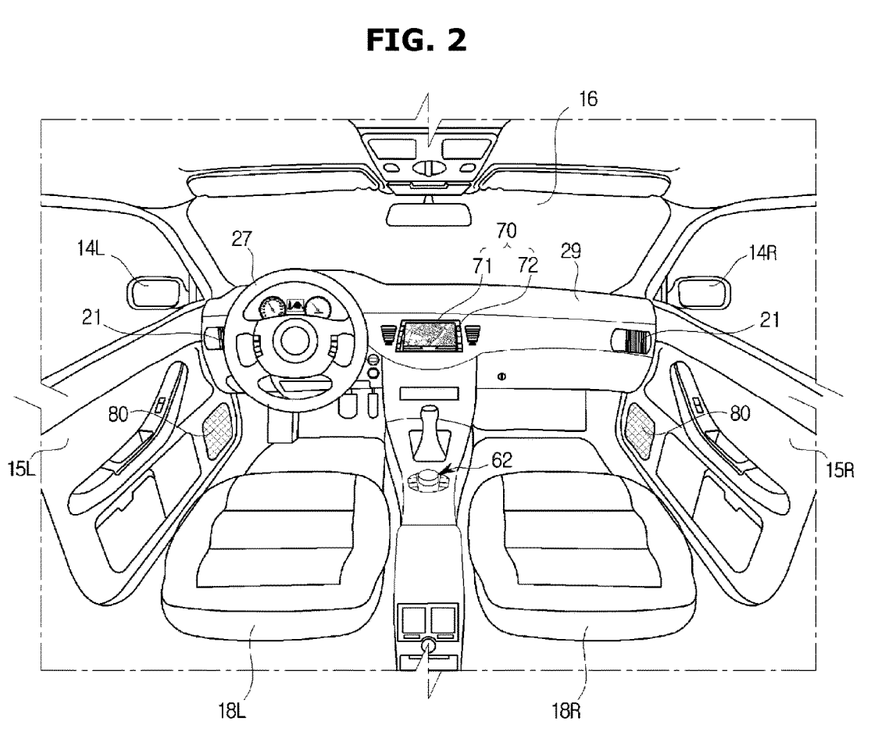
FIG. 2 is a view illustrating an internal configuration of a vehicle according to exemplary embodiments of the present disclosure.

FIG. 1 is an exterior view of a vehicle according to exemplary embodiments of the present disclosure, and FIG. 2 is a view illustrating an internal configuration of a vehicle according to exemplary embodiments of the present disclosure.

Referring to FIG. 1, an exterior of a vehicle 1 according to some embodiments includes wheels 12 and 13 which move the vehicle 1, doors 15L which shield the inside of the vehicle 1 from the outside, a front glass 16 which provides a view ahead of the vehicle 1 to a driver inside the vehicle 1, and side mirrors 14L and 14R which provide a view behind the vehicle 1 to the driver.

The wheels 12 and 13 include front wheels 12 provided in the front of the vehicle 1 and rear wheels 13 provided in the rear of the vehicle 1, and a driving device (not shown) provided inside the vehicle 1 provides rotatory power to the front wheels 12 or the rear wheels 13 so that the vehicle 1 moves forward or backward. Such a driving device may adopt an engine which generates the rotatory power by burning a fossil fuel or a motor which generates the rotatory power by receiving a power source from an electric condenser or a battery.

Doors 15L, 15R (FIG. 2) may be provided to be locked and unlocked in the left and right of a vehicle 1, a driver or a passenger is able to ride in the vehicle 1 when the doors are unlocked, and the inside of the vehicle is blocked from the outside when the doors are locked. Further, handles 17L and 17R which are able to lock and unlock the doors 15L and 15R (FIG. 2) may be provided outside the vehicle 1.

The front glass 16 is provided on a forward top side of the body so that the driver inside the vehicle 1 may obtain visual information ahead of the vehicle 1, and the front glass 16 is also referred to as a windshield glass.

Further, the side mirrors 14L and 14R include a left side mirror 14L provided on the left side of the vehicle 1 and a right side mirror 14R provided on the right side thereof so that the driver inside the vehicle 1 may obtain visual information in lateral and rearward directions of the vehicle 1.

In addition, the vehicle 1 may include sensors such as a proximity sensor which senses obstacles or other vehicles behind or beside the vehicle 1, a rain sensor which senses rainfall and an amount of the rainfall, etc.

The proximity sensor may transmit a sense signal from a lateral or rear surface of the vehicle, and may receive a reflected signal reflected from an obstacle such as another vehicle or the like. Whether the obstacle exists beside or behind the vehicle 1 may be sensed and a location of the obstacle may be detected on the basis of a waveform of the received reflected signal. As an example of such a proximity sensor, a method of emitting ultrasonic waves or infrared rays and calculating a distance up to an obstacle using the ultrasonic waves or infrared rays reflected from the obstacle may be adopted.

Referring to FIG. 2, a navigation apparatus 70 may be provide in a central region of a dashboard 29. The navigation apparatus 70 may be implemented as an audio video navigation (AVN) apparatus supporting not only a navigation system but also an audio system and a video system, and may include an AVN display 71 and an AVN input device 61.

The AVN display 71 may be implemented as a liquid crystal display (LCD), a light emitting diode (LED), a plasma display panel (PDP), an organic LED (OLED) or a cathode ray tube (CRT).

The AVN input device 61 may be provided in a region adjacent to the AVN display 71 in a hard key type, or when the AVN display 71 is implemented as a touch screen type, a front surface of the AVN display 71 may be provided in a touch panel form.

Further, a center input device 62 in a jog shuttle type may be provided between a driver's seat 18L and a passenger's seat 18R. A user may input a control command by rotating or pressing the center input device 62 or by pushing the center input device 62 in a vertical or lateral direction.

A sound output device 80 capable of outputting sound may be provided in the vehicle 1, and the sound output device 80 may be a speaker. The sound output device 80 may output sound needed for performing an audio function, a video function, a navigation function and other additional functions.

A steering wheel 27 is provided at the dashboard 29 in front of the driver's seat 18L.

Meanwhile, an air conditioning device is provided in the vehicle 1 to perform both heating and cooling, and temperature inside the vehicle 1 may be controlled by discharging heated or cooled air through an air opening 21.

As a difference between outside temperature of the vehicle 1 and a target temperature set by a user increases depending on weather conditions, air conditioning power consumed by an air conditioning apparatus increases. Accordingly, power charged, or stored, in a battery decreases. In the case of an electric vehicle, since power left in a battery has an effect on a drivable distance or time, it is necessary to efficiently control air conditioning power.

Figure 3:
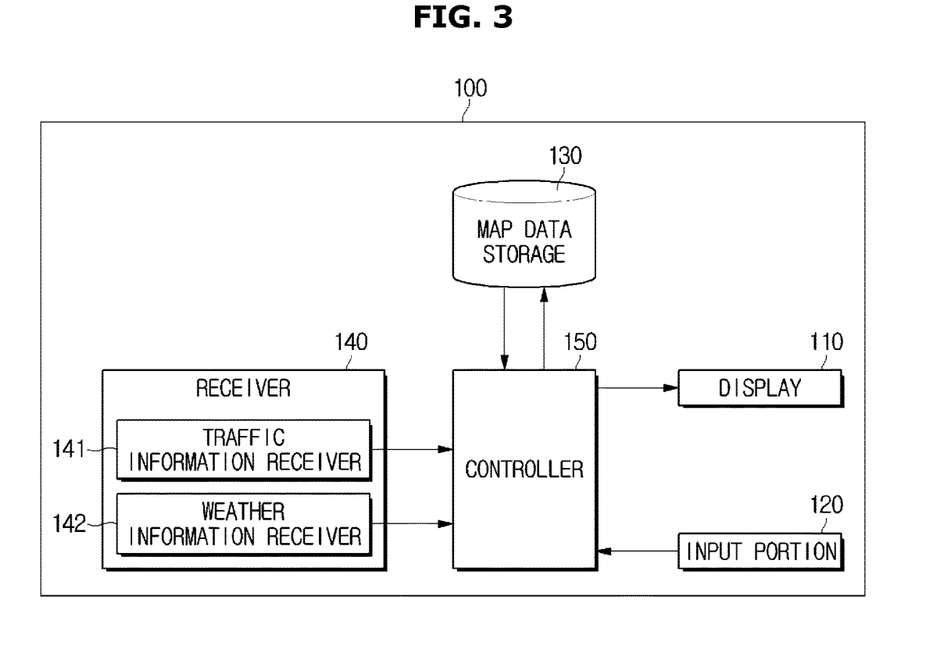
FIG. 3 is a control block diagram of a navigation apparatus configured to determine a path for consuming a minimum amount of air conditioning power and included in a vehicle in accordance with exemplary embodiments of the present disclosure.

FIG. 3 is a control block diagram of a navigation apparatus configured to determine a path for consuming a minimum amount of air conditioning power and included in a vehicle in accordance with exemplary embodiments of the present disclosure.

Referring to FIG. 3, a navigation apparatus 100 in accordance with exemplary embodiments includes a display 110 configured to display content, an input portion 120 configured to receive a user command, a storage 130 in which map data is stored, a receiver 140 configured to receive wireless signals, and a controller 150 configured to operate components of the navigation apparatus 100. The navigation apparatus 100 may be embodied as the navigation apparatus 70 of FIG. 2.

When the vehicle 1 is being driven on the road, the display 110 may visually display various pieces of information such as the current driving road, a detected path, a degree of congestion on the road and the like.

In addition, the display 110 may display a driving direction of the vehicle, a distance to the destination, current driving speed of the vehicle, an optimal path to the destination, and the like, thus displaying various pieces of information helpful for driving.

The display 110 in accordance with exemplary embodiments may display at least one of the least time consuming path, the shortest path and the driving path for consuming a minimum amount of air conditioning power to the destination input by the user, according to a control signal of the controller 150.

The display 110 may be embodied as the AVN display 71 described above with reference to FIG. 2.

The input portion 120 receives various user commands.

As an example, the input portion 120 may receive, from the user, a destination for the vehicle 1 and may receive a selection command for any one driving path when the display 110 displays the least time consuming path, the shortest path, and the driving path for consuming a minimum amount of air conditioning power, to the destination.

The input portion 120 may be embodied as the AVN input portion 72 described with reference to FIG. 2 when provided in the navigation apparatus 100 and may be embodied as the central input portion 62 when provided in the vehicle 1 separately from the navigation apparatus 100, but is not limited thereto.

The map data storage 130 stores map data.

The map data includes two-dimensional and/or three-dimensional road information, links of the roads, a node (intersecting point) list for each link, coordinates of each node, speed limit information for each link, and the like.

The map data storage 130 may be embodied as at least one of nonvolatile memory device such as a cache, a read-only memory (ROM), an erasable programmable ROM (EPROM), an electrically erasable programmable ROM (EEPROM), and a flash memory, a volatile memory such as random-access memory (RAM), and a storage medium such as a hard disk drive (HDD) and a compact disc ROM (CD-ROM) but is not limited thereto. The map data storage 130 may be a memory embodied as a chip, separate from a processor of the controller 150, and may be a single chip integrated with the processor.

The receiver 140 includes a traffic information receiver 141 configured to receive traffic information from a traffic control center or a server through a wireless communication network and a weather information receiver 142 configured to receive weather information from a meteorological agency or a server through a wireless communication network.

The traffic information receiver 141 receives traffic information related to traffic conditions on the road, such as a volume of traffic for each link of the roads, current driving speed, and the like.

The weather information receiver 142 receives weather information for each area. The weather information includes various pieces of information related to weather conditions such as temperature, humidity, insolation, fog, air volume and the like.

Each of the traffic information receiver 141 and the weather information receiver 142 may include a wireless communication interface including an antenna and a receiver configured to receive wireless signals. Also, each of the traffic information receiver 141 and the weather information receiver 142 may further include a wireless signal converting module for demodulating analog type wireless signals received through the wireless communication interface into digital control signals.

The traffic information receiver 141 and the weather information receiver 142 may be separate modules as described above but may also be embodied as one integrated module.

A wireless communication receiving method may include various well-known wireless communication methods such as wireless fidelity (Wi-Fi), wireless broadband, a global system for mobile communication (GSM), code division multiple access (CDMA), wideband CDMA (WCDMA), universal mobile telecommunication system (UMTS), time division multiple access (TDMA) long term evolution (LTE) and the like.

The controller 150 controls each component included in the navigation apparatus 100. Detailed operations of the controller 150 will be described below.

The controller 150 includes a memory (not shown) configured to store algorithms for controlling operations of the components in the navigation apparatus 100 or data of programs reproducing the algorithms and a processor (not shown) configured to perform the operations described above using the data stored in the memory. Here, the memory and the processor may be embodied as separate chips. Also, the memory and the processor may be embodied as a single chip.

At least one component may be added or deleted corresponding to performance of the components of the navigation apparatus 100 shown in FIG. 3. Also, it would be easily understood by one of ordinary skill in the art that mutual positions of the components may be changed depending on performance and structure of a system.

Meanwhile, each of the components shown in FIG. 3 may be a software component and/or a hardware component such as a field-programmable gate array (FPGA) and an application-specific integrated circuit (ASIC).

Figure 4:
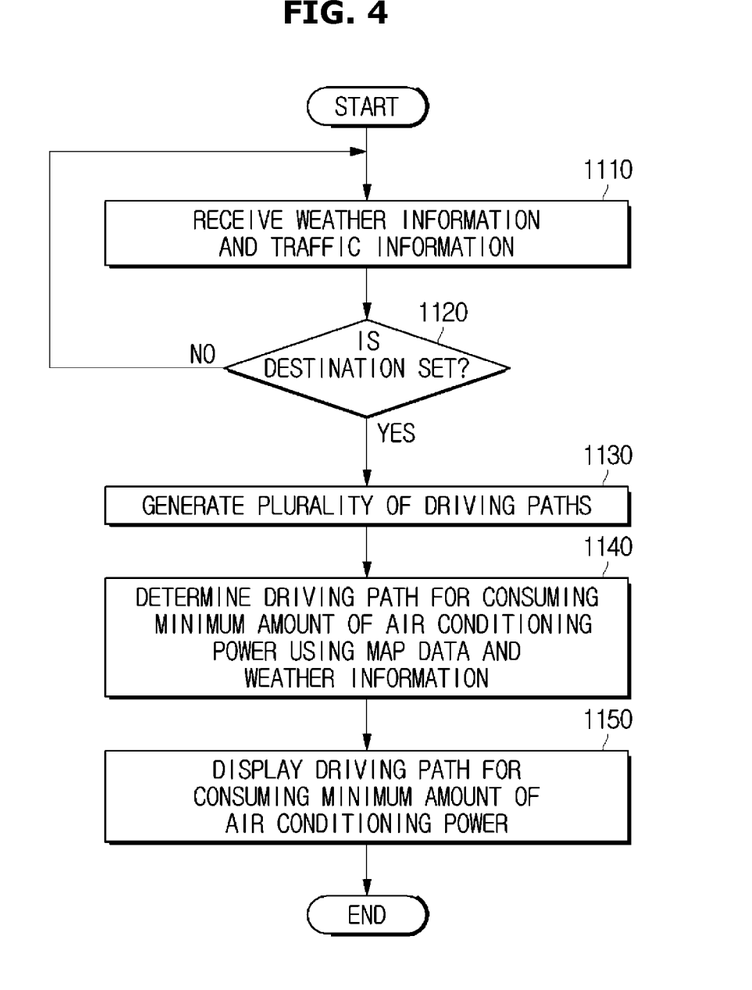
FIG. 4 is a flowchart illustrating a method of controlling the navigation apparatus according to exemplary embodiments of the present disclosure.
Figure 5:
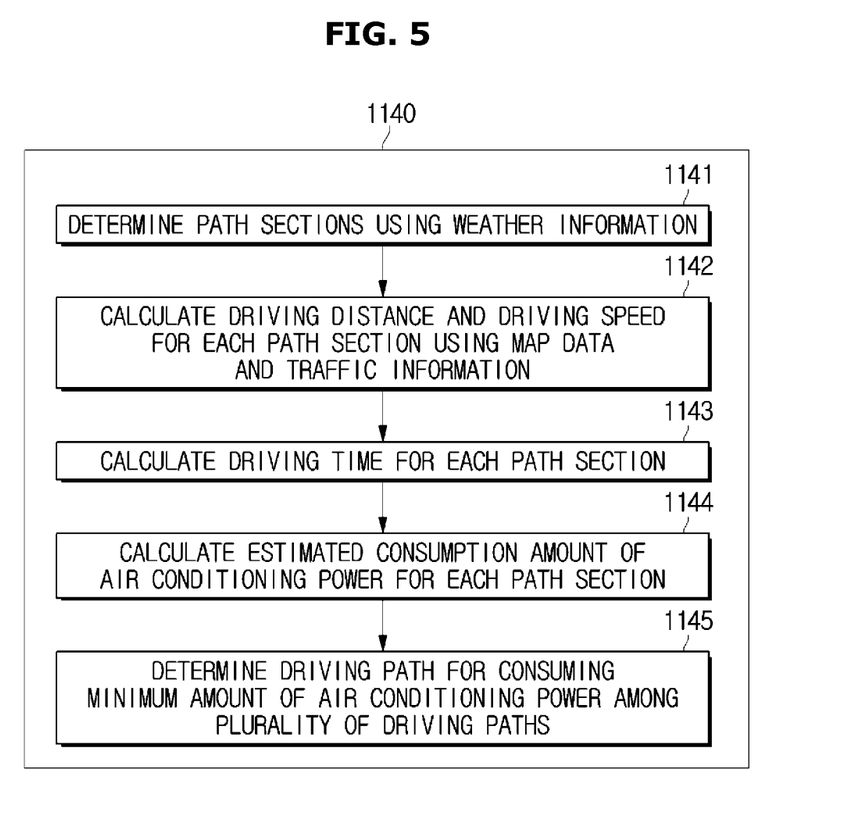
FIG. 5 is a flowchart illustrating an operation of determining a path for consuming a minimum amount of power using map data and weather information shown in FIG. 4.

Hereinafter, referring to FIGS. 4 to 9, a process in which the controller 150 of the navigation apparatus 100 according to exemplary embodiments controls each of the components of the navigation apparatus 100 will be described in detail. FIG. 4 is a flowchart illustrating a method of controlling the navigation apparatus according to exemplary embodiments, and FIG. 5 is a flowchart illustrating an operation of determining a path for consuming a minimum amount of power using map data and weather information shown in FIG. 4.

First, the controller 150 receives the weather information and the traffic information through the receiver 140 (1110). Also, when the input portion 120 receives a destination (YES in 1120), the controller 150 generates a plurality of driving paths whose final destination is the received destination (1130).

Then, the controller 150 generates one or more path sections using weather information for each area received by the weather information receiver 142 and determines a driving path for consuming a minimum amount of air conditioning power among the plurality of driving paths, using weather information for each path section and the map data stored in the map data storage 130 (1140). This will be described below with reference to FIG. 5.

Meanwhile, when receiving the destination (YES in 1120), the controller 150 may determine a shortest driving path (that is, a least time consuming path) among the plurality of driving paths to the destination using the map data stored in the map data storage 130 and traffic information received by the traffic information receiver 141. A driving time may be determined based on a distance of each link included in the map data and a current driving speed for each link included in the traffic information.

Also, when receiving the destination (YES in 1120), the controller 150 may determine a driving path with a shortest driving distance from among the plurality of driving paths to the destination using the map data stored in the map data storage 130. A driving distance may be determined based on the length of each link included in the map data.

Hereinafter, referring to FIG. 5, an operation (1140) of determining a driving path for consuming a minimum amount of air conditioning power will be described in detail.

Referring to FIG. 5, the operation (1140) of determining the driving path for consuming a minimum amount of air conditioning power includes dividing the driving path into one or more path sections using the weather information for each area (1141).

Figure 6:
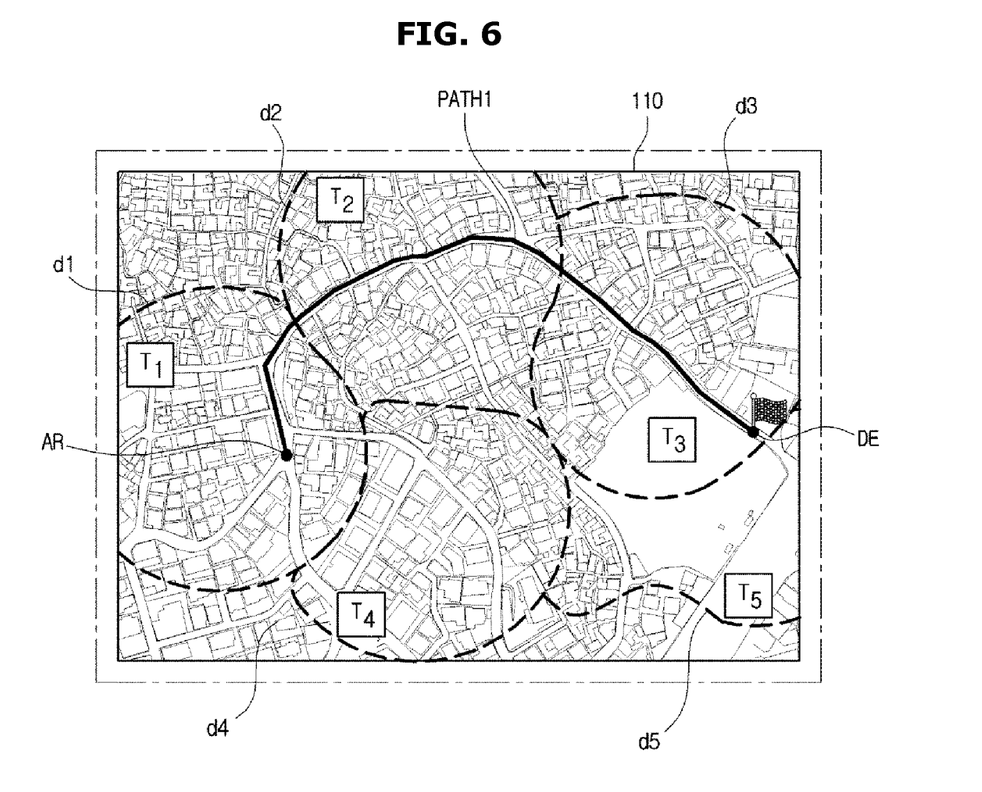
FIG. 6 is a map illustrating areas through which a first driving path passes according to exemplary embodiments of the present disclosure.

For convenience of description, referring to FIGS. 6 to 8, a description will be made assuming that a first driving path PATH1 for sequentially passing through a first area d1, a second area d2, and a third area d3 and a second driving path PATH2 for sequentially passing through the first area d1, a fourth area d4, a fifth area d5, and the third area d3 as a plurality of driving paths to the same destination DE. FIG. 6 is a map illustrating areas through which the first driving path passes, FIG. 7 is a map illustrating areas through which the second driving path passes, and FIG. 8 is a schematic diagram briefly illustrating the first driving path and the second driving path.

Referring to FIG. 6, through the weather information receiver 142, the controller 150 may receive first weather information T1 with respect to the first area d1, second weather information T2 with respect to the second area d2, and third weather information T3 with respect to the third area d3, through which the first driving path PATH1 passes.

Figure 7:
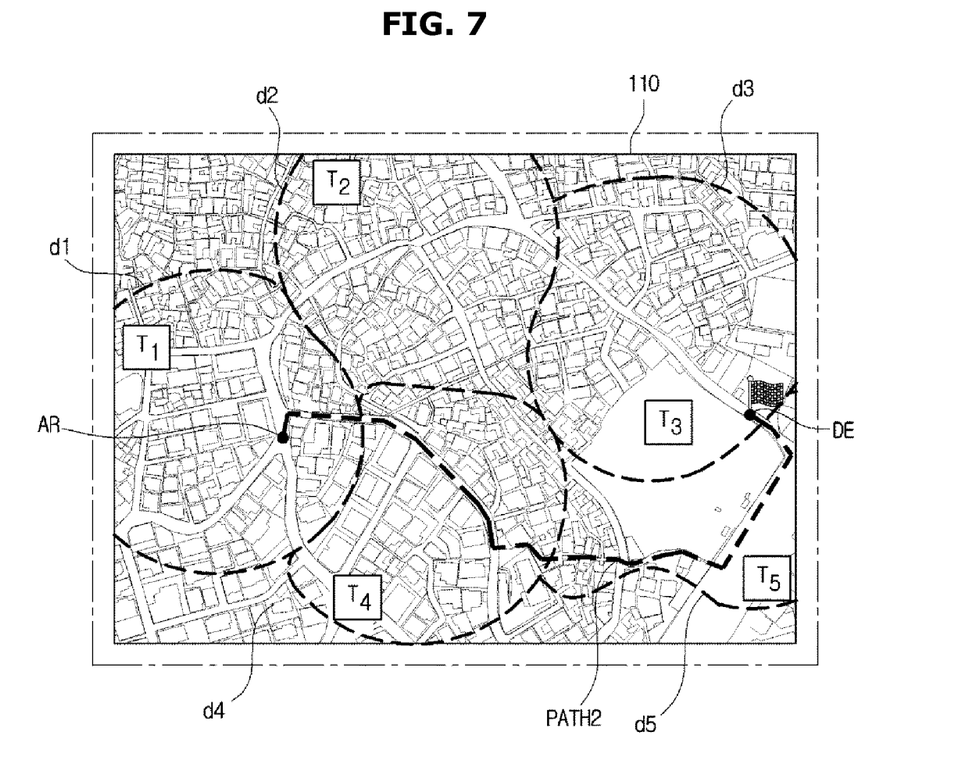
FIG. 7 is a map illustrating areas through which a second driving path passes according to exemplary embodiments of the present disclosure.

Also, referring to FIG. 7, through the weather information receiver 142, the controller 150 may receive the first weather information T1 with respect to the first area d1, fourth weather information T4 with respect to the fourth area d4, fifth weather information T5 with respect to the fifth area d5, and the third weather information T3 with respect to the third area d3, through which the second driving path PATH2 passes.

Figure 8:
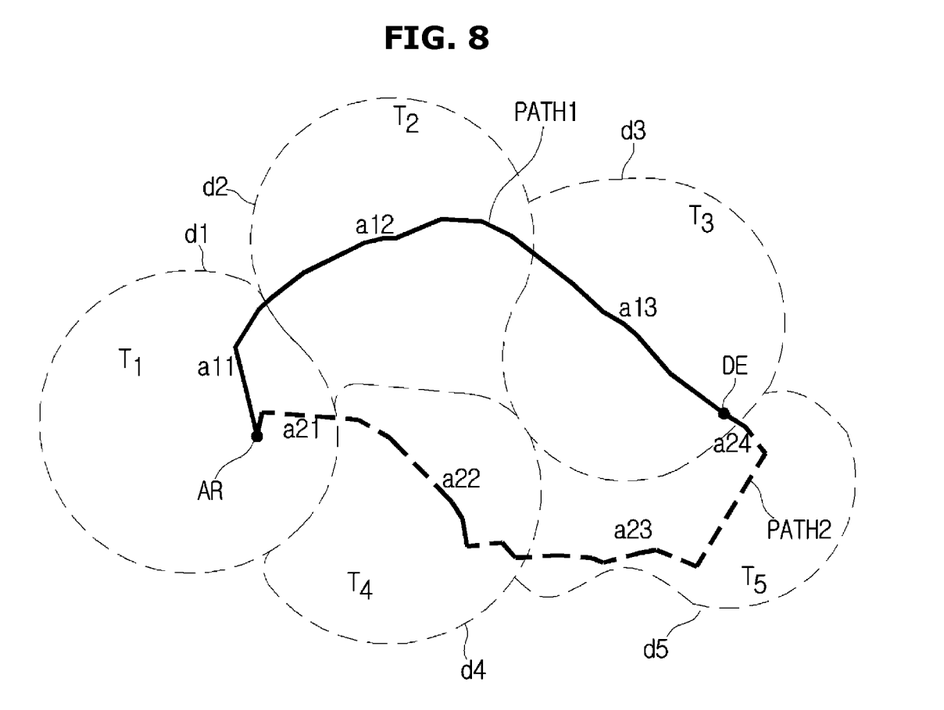
FIG. 8 is a schematic diagram illustrating the first driving path of FIG. 6 and the second driving path of FIG. 7.

When the driving paths and the areas through which each of the driving paths passes are simplified, the driving paths and the areas may be like those shown as in FIG. 8. Referring to FIG. 8, the controller 150 in accordance with exemplary embodiments classifies a road of the first area d1 through which the first driving path PATH1 passes as a path section a11, a road of the second area d2 through which the first driving path PATH1 passes as a path section a12, and a road of the third area d3 through which the first driving path PATH1 passes as a path section a13.

Also, the controller 150 in accordance with exemplary embodiments classifies a road of the first area d1 through which the second driving path PATH2 passes as a path section a21, a road of the fourth area d4 through which the second driving path PATH2 passes as a path section a22, a road of the fifth area d5 through which the second driving path PATH2 passes as a path section a23, and a road of the third area d3 through which the second driving path PATH2 passes as a path section a24.

Also, the controller 150 calculates a driving distance and a driving speed of each path section using the map data and the traffic information (1142, refer to FIG. 5).

In detail, to calculate a driving distance and a driving speed of the first driving path PATH1, the controller 150 calculates a driving distance of each of the path section a11, the path section a12, and the path section a13 using the map data and calculates a driving speed of each of the path section a11, the path section a12, and the path section a13 using the traffic information.

Also, to calculate a driving distance and a driving speed of the second driving path PATH2, the controller 150 calculates a driving distance of each of the path section a21, the path section a22, the path section a23, and the path section a24 using the map data and calculates a driving speed of each of the path section a21, the path section a22, the path section a23, and the path section a24 using the traffic information.

Then, the controller 150 calculates a driving time for each path section based on the calculated driving distances and driving speeds (1143, refer to FIG. 5).

In detail, the controller 150 calculates a driving time of the first driving path PATH1 based on the driving distances and driving speeds of the path section a11, the path section a12, and the path section a13 and calculates a driving time of the second driving path PATH2 based on the driving distances and driving speeds of the path section a21, the path section a22, the path section a23 and the path section a24.

Then, the controller 150 calculates an estimated amount of air conditioning power consumed for each driving path when the vehicle 1 would be driven on each driving path, based on the calculated driving time and the weather information for each driving section (1144, refer to FIG. 5).

As an example, when temperature information is received as the weather information, the controller 150 may determine a driving path which passes through a path section with a smallest difference from a target temperature as a driving path for consuming a minimum amount of air conditioning power. The target temperature may be a value input from the user through the input portion 120.

In detail, the controller 150 may calculate air conditioning power consumed by the vehicle per hour for each driving path using Equation 1.

$$\dot{Q}[W] = C_p \{ \dot{m}(T_d - T_a)(1-r) + \dot{m}(T_d - T_r)r \} / COP \quad \text{[Equation 1]}$$

Here, Q[W] indicates air conditioning power per hour, Cp indicates specific heat of air specific heat, m indicates a flow rate of air ejected into the vehicle 1, Td indicates a target ejection temperature of the air which flows into the vehicle, Ta indicates an external temperature of the vehicle 1 included in the weather information, r indicates a mixing ratio of indoor air, and COP indicates an efficiency constant of an air conditioning system.

Here, Td is a value calculated by an air conditioning apparatus and may be obtained by Equations 2 and 3.

$$\dot{Q} = k(T\text{incar} - T\text{set}) + \alpha \quad \text{[Equation 2]}$$

Here, Q is a power value substituted in Equation 3, k indicates a preset constant, Tincar indicates a temperature inside the vehicle 1, obtained by a temperature sensor provided at the vehicle 1, Tset indicates a target temperature, and α indicates various additional elements having effects on power consumption such as insolation, an ambient temperature, and the like. Q obtained by Equation 2 is substituted in Equation 3.

$$\dot{Q} = \dot{m} * C_p * (T_a - T_d) \quad \text{[Equation 3]}$$

Q indicates a power value obtained by Equation 2, m indicates a flow rate of air ejected into the vehicle 1, Cp indicates specific heat of air specific heat, Ta indicates an ambient temperature of the vehicle 1 included in the weather information, and a target ejection temperature Td of air which flows into the vehicle 1 may be obtained through Equation 3 described above.

Td obtained as described above may be substituted in Equation 1 and accordingly air conditioning power per hour Q[W] may be calculated. Also, the controller 150 may calculate an estimated consumption amount of air conditioning power of the path section a11 by multiplying the Q[W] calculated with respect to the path section a11 by the driving time of the path section a11, an estimated consumption amount of air conditioning power of the path section a12 by multiplying the Q[W] calculated with respect to the path section a12 by the driving time of the path section a12, and an estimated consumption amount of air conditioning power of the path section a13 by multiplying the Q[W] calculated with respect to the path section a13 by the driving time of the path section a13 and may calculate an estimated consumption amount of air conditioning power of the first driving path by summing the estimated consumption amounts of air conditioning power of the path sections a11, a12 and a13. Similarly, a calculation with respect to the second driving path may be performed and an estimated consumption amount of air condition power of each driving path may be calculated.

Next, the controller 150 determines a driving path for consuming a minimum amount of air conditioning power from among the plurality of driving paths from a current position AR to the destination DE (1145, refer to FIG. 5).

In detail, the controller 150 compares the estimated consumption amount of air conditioning power of the first driving path PATH1 with the estimated consumption amount of air conditioning power of the second driving path PATH2 and determines one of the driving paths with a lesser estimated consumption amount of air conditioning power to be the driving path for consuming a minimum amount of air conditioning power.

Although the embodiments described above has been described with an example of receiving temperature information as the weather information, the controller 150 may receive humidity information as the weather information as another example. In this case, the controller 150 may determine a driving path passing through path sections with the lowest humidity level as the driving path for consuming a minimum amount of air conditioning power. When the vehicle 1 is being driven on the driving path passing through the path sections with the lowest humidity level as described above, air conditioning power consumed in a process of changing a phase of vapor in the air may be reduced.

The weather information is not limited to the temperature information and the humidity information described above and may include various pieces of information related to weather conditions such as insolation, fog, air volume and the like. In this case, the controller 150 may also determine a driving path for consuming a minimum amount of air conditioning power for each type of weather information.

Also, although the first driving path PATH1 and the second driving path PATH2 have been described as the plurality of driving paths in the embodiments described above, the number of available driving paths from the current position AR to the destination DE is not limited thereto.

Figure 9:
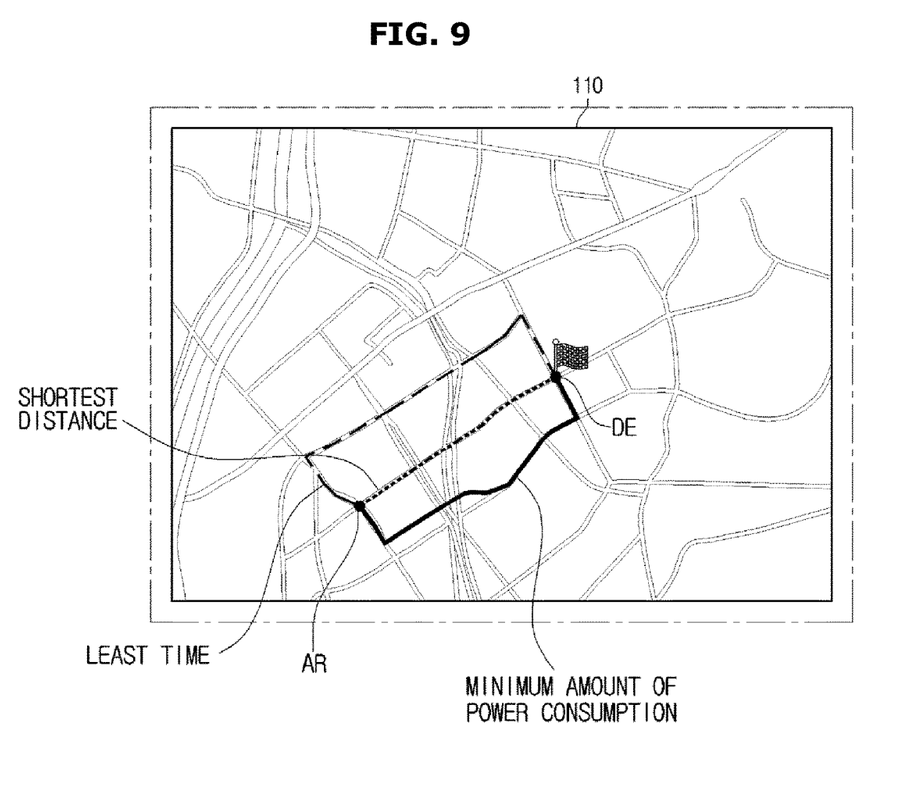
FIG. 9 is a view illustrating an example of a screen of the display that displays a driving path according to exemplary embodiments of the present disclosure.

Then, the controller 150 controls the display 110 to display the driving path for consuming a minimum amount of air conditioning power (1150, refer to FIG. 4). FIG. 9 is a view illustrating an example of a screen of the display that displays the driving path.

Referring to FIG. 9, the controller 150 may control the display 110 to not only display the driving path for consuming a minimum amount of air conditioning power but also further display a least time consuming path, a shortest path and the driving path for consuming a minimum amount of air conditioning power.

The user may select any one of the least time consuming path, the shortest path, and the driving path for consuming a minimum amount of air conditioning power displayed on the screen by manipulating the input portion 120. The controller 150 displays the driving path selected by the user, matched with a map, and guides a path from the current position AR to the destination DE according to the selected driving path.

Also, the controller 150 may select any one of the least time consuming path, the shortest path, and the driving path for consuming a minimum amount of air conditioning power and control the display 110 to display the selected driving path as an optimal path or control the vehicle 1 to autonomously drive on the selected driving path.

In addition, since the driving path for consuming a minimal air conditioning power determined by the controller 150 may be utilized by the vehicle 1 in various forms, embodiments are not limited to the embodiments described above.

As is apparent from the above description, a navigation apparatus, a vehicle including the same, and a method of controlling the vehicle in accordance with exemplary embodiments of the present disclosure provide a path for consuming a minimum amount of air conditioning power, thereby selecting a path capable of efficiently reducing power charged, or stored, in a battery of the vehicle as an optimal driving path.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A navigation apparatus comprising:
a receiver for receiving weather information for one or more areas;
a map data storage in which map data is stored;
a controller for generating one or more path sections using the weather information for the one or more areas and for determining a driving path for consuming a minimum amount of air conditioning power using the weather information and the map data for each path section; and
a display for displaying the driving path for consuming the minimum amount of air conditioning power determined by the controller,
wherein the controller is configured to calculate the air conditioning power consumed by a vehicle per hour for one or more traveling routes and to calculate the air conditioning power using a flow rate of air ejected into the vehicle, a mixing ratio of indoor air, and a target ejection temperature of the air which flows into the vehicle.

2. The navigation apparatus of claim 1, wherein the receiver receives temperature information as the weather information.

3. The navigation apparatus of claim 2, wherein the controller determines a driving path passing through the one or more path sections with a smallest temperature difference from a target temperature as the driving path for consuming the minimum amount of air conditioning power.

4. The navigation apparatus of claim 1, wherein the controller calculates a driving time for each path section using the map data, calculates an estimated consumption amount of air conditioning power using the calculated driving time and the weather information for each of the one or more path sections, and determines a driving path with a minimum estimated consumption amount of air conditioning power.

5. The navigation apparatus of claim 4, wherein the controller calculates a driving distance and a driving speed for each path section using the map data and calculates the driving time for each path section based on the driving distance and the driving speed.

6. The navigation apparatus of claim 1, wherein the receiver further receives traffic information, and
wherein the controller calculates a driving time for each path section using the map data and the traffic information, calculates an estimated consumption amount of air conditioning power using the calculated driving time and the weather information for each of the one or more path sections, and determines a driving path with a minimum estimated consumption amount of air conditioning power.

7. The navigation apparatus of claim 6,
wherein the controller determines a driving path with a shortest driving time using the map data and the traffic information, determines a driving path with a shortest driving distance using the map data, and determines a driving path with a minimum estimated consumption amount of the air conditioning power, and
wherein the display displays the driving path with the shortest driving time, the driving path with the shortest driving distance, and the driving path with a minimum estimated consumption amount of the air conditioning power.

8. The navigation apparatus of claim 1, wherein the receiver receives humidity information as the weather information.

9. The navigation apparatus of claim 8, wherein the controller determines a driving path passing through the one or more path sections with a lowest average humidity level as the driving path for consuming the minimum amount of air conditioning power.

10. A vehicle comprising:
a receiver for receiving weather information for one or more areas;
a map data storage in which map data is stored;
a controller for generating one or more path sections using the weather information for the one or more areas and for determining a driving path for consuming a minimum amount of air conditioning power using the weather information and the map data for each path section; and
a display for displaying the driving path determined by the controller,
wherein the controller is configured to calculate the air conditioning power consumed by a vehicle per hour for one or more traveling routes and to calculate the air conditioning power using a flow rate of air ejected into the vehicle, a mixing ratio of indoor air, and a target ejection temperature of the air which flows into the vehicle.

11. A method of controlling a vehicle, comprising:
receiving weather information for one or more areas;
generating one or more path sections using the weather information for the one or more areas and determining a driving path for consuming a minimum amount of air conditioning power using the weather information and map data for each path section; and
displaying the driving path determined by the step of determining the driving path,
wherein the step of determining of a driving path comprises:
calculating the air conditioning power consumed by a vehicle per hour for one or more traveling routes; and
calculating the air conditioning power using a flow rate of air ejected into the vehicle, a mixing ratio of indoor air, and a target ejection temperature of the air which flows into the vehicle.

12. The method of claim 11, wherein the step of receiving weather information comprises receiving temperature information as the weather information.

13. The method of claim 12, wherein the step of determining a driving path comprises determining a driving path passing through the one or more path sections with the smallest temperature difference from a target temperature as the driving path for consuming the minimum amount of air conditioning power.

14. The method of claim 11, wherein the step of determining a driving path comprises calculating a driving time for each path section using the map data, calculating an estimated consumption amount of air conditioning power using the calculated driving time and the weather information for each of the one or more path sections, and determining a driving path with a minimum estimated consumption amount of air conditioning power as the driving path for consuming the minimum amount of air conditioning power.

15. The method of claim 14, wherein the step of determining the driving path comprises calculating a driving distance and a driving speed for each path section using the map data and calculating the driving time for each path section based on the driving distance and the driving speed.

16. The method of claim 11, further comprising receiving traffic information before the step of determining the driving path,
wherein the step of determining the driving path comprises calculating a driving time for each path section using the map data and the traffic information, calculating an estimated consumption amount of air conditioning power using the calculated driving time and the weather information for each of the one or more path sections, and determining a driving path with a minimum estimated consumption amount of air conditioning power.

17. The method of claim 16,
wherein the step of determining the driving path comprises determining a driving path with a shortest driving time using the map data and the traffic information, determining a driving path with a shortest driving distance using the map data, and determining a driving path with a minimum estimated consumption amount of air conditioning power as the driving path for consuming the minimum amount of air conditioning power, and
wherein the step of displaying comprises displaying the driving path with the shortest driving time, the driving path with the shortest driving distance, and the driving path with a minimum estimated consumption amount of the air conditioning power.

18. The method of claim 16, further comprising receiving traffic information before the step of determining the driving path, wherein the step of determining the driving path comprises calculating a driving distance for each path section using the map data, calculating a driving speed for each path section using the traffic information, and calculating the driving time for each path section based on the driving distance and the driving speed.

19. The method of claim 11, wherein the receiving of weather information comprises receiving humidity information as the weather information.

20. The method of claim 19, wherein the step of determining the driving path comprises determining a driving path passing through the one or more path sections with a lowest average humidity level as the driving path for consuming the minimum amount of air conditioning power.

* * * * *